Aug. 9, 1949.　　　　　J. A. C. YULE　　　　　2,478,555
OPTICAL SCANNING DEVICE

Filed Nov. 28, 1947　　　　　　　　　　2 Sheets-Sheet 1

JOHN A. C. YULE
INVENTOR

BY
ATT'Y & AG'T

Aug. 9, 1949.　　　　　J. A. C. YULE　　　　2,478,555
OPTICAL SCANNING DEVICE
Filed Nov. 28, 1947　　　　　　　　　　　2 Sheets-Sheet 2
FIG. 4.
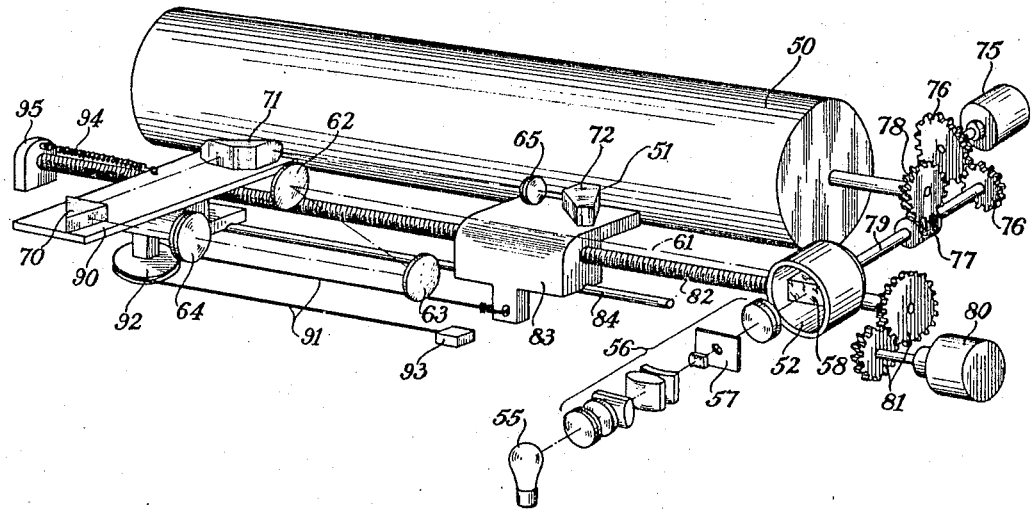
FIG. 5.
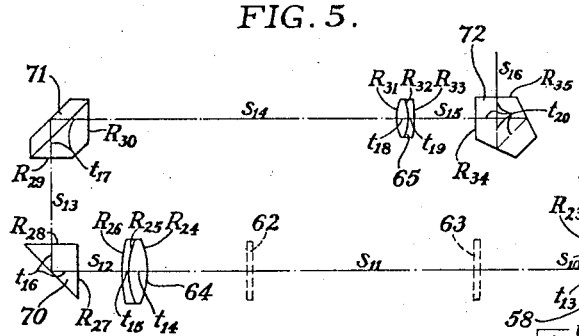
FIG. 5A.
FIG. 6.
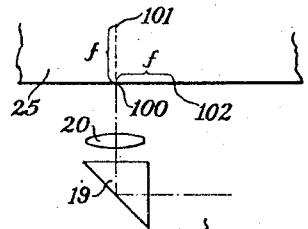
FIG. 7.
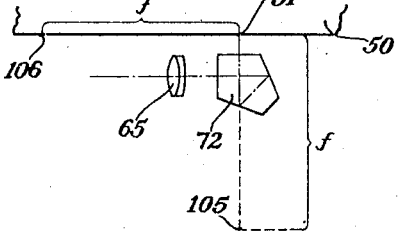
JOHN A. C. YULE
INVENTOR
BY
ATTORNEYS Patented Aug. 9, 1949

2,478,555

UNITED STATES PATENT OFFICE 2,478,555

OPTICAL SCANNING DEVICE

John A. C. Yule, Rochester, N. Y., assignor to Eastman Kodak Company, Rochester, N. Y., a corporation of New Jersey Application November 28, 1947, Serial No. 788,578

4 Claims. (Cl. 88—24)

This is a continuation-in-part of my application, Serial Number 675,335, filed June 8, 1946, now abandoned.

This invention relates to optical scanning devices particularly for use in making contact halftone screens as described in copending application, Serial Number 675,398, filed June 8, 1946, by Goldberg and Sandvik.

The object of the present invention is to provide a scanning device for scanning a picture or photosensitive surface without varying the length of the optical path taken by the scanning beam. This feature of the invention is particularly useful when the scanning spot is a real punctual image of some picture area as distinguished from a mere spot of light whose characteristics are controlled solely by lenses and the like. One particularly useful embodiment of the invention employs such a scanning system in connection with a film mounted on a cylinder which is rotated while the scanning point moves longitudinally of the cylinder for scanning the total area.

It is a further object of the invention to provide an optical system to perform the above operations, which optical system is simple, easily constructed and stable with respect to its adjustment.

According to the invention applied to the rotatable cylinder type of scanning, an illuminated picture area is arranged to be imaged by an optical system including at least one objective and at least three reflecting surfaces, the image being formed on the surface of the cylinder. When an opaque cylinder material is used with the film wrapped on the outside, the whole optical system must be outside the cylinder, but transparent cylinders permit scanning from the inside. The optical system may include additional objectives or relay lenses and also additional reflectors. The beam from the picture area runs parallel to the cylinder or, if the beam leaves the picture area at some other angle, it is rendered parallel to the cylinder by suitable mirrors or other reflectors. The present invention is concerned only with the beam after it is parallel to the cylinder and as it approaches the cylinder surface. According to the invention two of the three essential reflecting surfaces, preferably in the form of a Porro prism, receive this light beam traveling parallel to the cylinder and reflect it back again still parallel to the cylinder. The third essential reflecting surface then picks up the reflecting beam and in turn reflects it radially toward the cylinder surface. The objective may of course be anywhere in the path of the beam but is preferably between the third reflecting surface and the cylinder in order to form a small scanning image. Means are provided for rotating the cylinder and at the same time for moving the third reflector and the objective slowly along the cylinder so that the scanning beam actually follows a close spiral path with the convolutions immediately adjacent to each other. The unit consisting of the other two essential reflecting surfaces is also moved parallel to the cylinder but at half the linear speed of the third reflector whereby the total optical path length remains constant. The reflecting surfaces can be carried on suitable mounts which are driven by screw thread arrangements suitably geared to give the 2 to 1 speed ratio or alternatively the third reflector can be driven by any suitable means and the two-reflector unit may be moved under the opposing action of a spring and a cord or other flexible member running from the third reflector over a pulley on the two-reflector unit to a support fixed relative to the cylinder axis.

In ordinary scanning systems which do not involve the focusing of a real image on the film, the present invention is not particularly useful but would be some advantage in a highly precise system because maintenance of constant path length is a simple way of insuring constant intensity and constant area of the scanning spot.

A further object of my invention is to provide an arrangement for supporting the moving optical system so as to minimize and practically eliminate unwanted movement or shake of the scanning spot or picture.

Other objects and advantages of the invention will be apparent from the accompanying drawings in which:

Fig. 4 is a perspective view of a preferred embodiment of the invention.

Fig. 5 is a plan view of the optical system employed in Fig. 4; Fig. 5A is an end view of part of the optical system shown in Fig. 5.

Fig. 6 illustrates the principle of proper mounting of the optical system shown in Fig. 1 for inherent optical stability.

Fig. 7 similarly illustrates the principle of inherent stability mounting with respect to Fig. 4.

Figure 1:
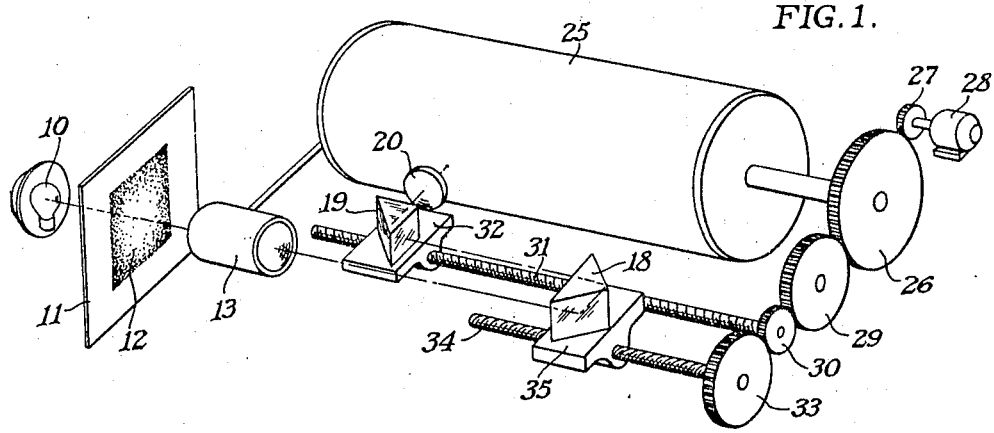
Fig. 1 is a perspective view of one embodiment of the invention.
Figure 2:
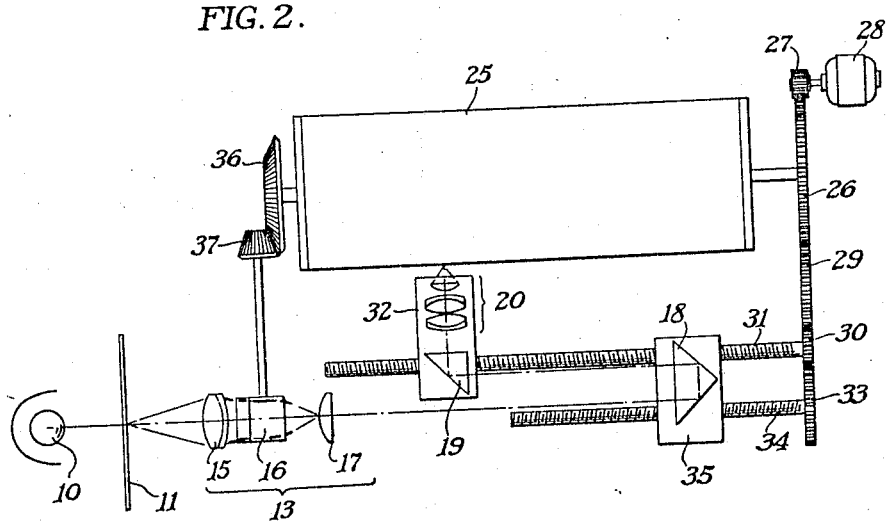
Fig. 2 is a plan view thereof.

In Fig. 1 light from a lamp 10 illuminates a picture area 12 on a transparent support 11. The picture area is shown as the negative of a halftone dot to correspond to the copending Goldberg and Sandvik application mentioned above. An optical system 13 directs a beam from the picture area parallel to a scanning cylinder 25. The optical system is shown in more detail in Fig. 2 and consists of an objective 15 and a rotating glass block 16 which acts as an optical compensator all forming an image of the picture 12 in a field lens 17. According to the invention this light beam traveling parallel to the cylinder 25 is picked up by a Porro prism 18 and reflected back still parallel to the cylinder 25. A right angle prism 19 acting as a third reflecting surface, then reflects the beam radially toward the cylinder 25 through an objective such as a microscope objective 20. This system forms a real image of the picture 12 as relayed to the field lens 17. For scanning purposes the cylinder 25 is rotated by a motor 28 through gears 27 and 26. At the same time through an idler gear 29 engaging a gear 30 which rotates a screw 31, a mount 32, carrying the prism 19 and objective 20, is driven longitudinally of the cylinder 25.

If only this unit were so driven, the optical path length between the image in the field lens 17 and the surface of the cylinder 25 would change and hence the image on the cylinder surface would go out of focus. According to the invention the Porro prism 18 is carried on a mount 35 which is also driven longitudinally of the cylinder 25 but at half the speed of the mount 32. This half speed drive is provided through a screw 34 driven by a gear 33 of twice the diameter of the gear 30 with which it meshes.

Since this particular embodiment of the invention is used for making a halftone screen by intermittently exposing the sensitive film on the drum 25 it is preferable, as pointed out by Goldberg and Sandvik to have the actual picture image move with the film (i. e. remain fixed relative to the film) during each exposure interval. This feature is provided by the rotation of the optical compensator 16 by bevel gears 36 and 37 connected to the cylinder 25. The present invention is concerned however only with the optical path between the image in the field lens 17 and the film on the cylinder 25. In fact it is only concerned with part of this path and there is no reason why the part of the system including the lamp 10, picture 12 and unit 13 could not be at some other angle with a suitable mirror for rendering the beam therefrom parallel to the cylinder 25.

Figure 3:
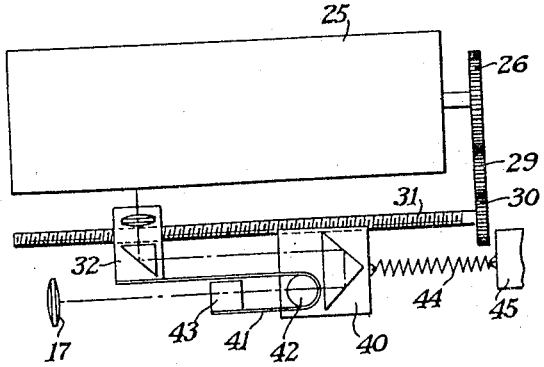
Fig. 3 is a plan view of a feature of an alternative arrangement.

Since the present invention is concerned only with parts optically after the field lens 17, Fig. 3 shows only this portion of the system. In Fig. 3 the relative linear rates of the prism mounts 32 and 40 in this case are automatically controlled by having a pulley carried by the mount 40 and by having a cord 41 run from the mount 32 over the pulley 42 to a rigid point 43 on the housing of the instrument. That is, the point 43 does not move relative to the axis of the cylinder 25 either longitudinally, radially, or obliquely. Tension is maintained in the cord 41 by a spring 44 pulling on the mount 40 and attached to the housing of the instrument at the point 45. With this cord arrangement the support 40 necessarily must move with half the speed of the support 32. The pulley 42 must be accurately circular and centered of course.

In Fig. 4, sensitive film is wrapped on the scanning drum 50 and scanned at the point 51 by a picture of a plurality of dots. In this particular arrangement, the master dot is in the form of an object drum 52 which is a transparent drum on the surface of which is a large number of relatively large dots forming a pattern with say 15 dots to the linear inch. This master drum may be made in the manner shown in Fig. 1 or by simple step and repeat printing from a single large dot. This particular embodiment of the invention is thus effectively a two-stage reduction system. The advantages of such an arrangement are described in the copending Goldberg and Sandvik application mentioned above. One such master drum 52 is made quite accurately and then a large number of contact screens according to the invention are run off relatively rapidly because much greater area of film is scanned at one time. That is, the picture at the point 51 is many times larger than in the embodiment shown in Fig. 1 where only a single dot is exposed at a time.

Light from a light source 55 through suitable condenser lenses 56 and mask 57 sends light to a prism 58 which reflects the light through the object drum 52 and uniformly illuminates the area of the drum which is imaged, by the subsequent optical system, at the point 51 on the scanning cylinder 50. This light from the object drum, as indicated by the axis 61, is reflected by mirrors 62 and 63 through a lens 64 which together with the lens 65 forms the required image at the point 51.

The light is reflected once by a right angle prism 70 and a second and third time by a roof or Amici prism 71. Thus there are actually three reflections in the unit which receives the light parallel to the scanning cylinder axis and reflects it back again parallel to the cylinder, whereas in Fig. 1 there were only two reflecting surfaces forming this unit. This roof prism 71 is one of the features which adds stability to the optical system with respect to vibration. That is, slight vibration of this unit does not introduce an objectionable amount of vibration of the image at the point 51, because the unit is essentially a triple mirror and hence an autocollimator.

Following the lens 65, the light beam is reflected by a penta prism 72 and thus the light suffers two reflections which corresponds to the single reflection of the prism 19 of Fig. 1.

A motor 75 through gears 76 drives a worm 77 and simultaneously rotates the shaft 79 and the object dum 52. The worm 77, through worm gear 78, drives the scanning cylinder 50 synchronously with the rotation of the object drum 52 so that while the optical axis scans the cylinder at the point 51, the image of the master dot on the object drum 52, as formed at the point 51 remains stationary with respect to the surface of the cylinder 50.

A second motor 80 is synchronized with the motor 75 and through gears 81 drives the long screw 82. Gears may be used between the shaft 79 and the screw 82 for driving the latter, but the separate synchronous motor has been found preferable. The scanning head consisting of the lens 65 and the penta prism 72 is carried on a mount 83 which forms a nut on the screw 82. This mount 83 also rides on a guide bar 84.

The second unit of the optical system consisting of prisms 70 and 71 is carried on a mount 90 which also rides on the guide bar 84 and is driven at half the speed of the mount 83 by means of a cable 91 which acts as a tow rope attached to the mount 83 and which passes over a pulley 92 rotatably mounted on the mount 90. The end of the cable is rigidly attached to the housing for the whole system, a small block 93 of which is shown, the remainder being omitted for the sake of clarity. The cable 91 is held taut by a spring 94 engaging the mount 90 and urging it to the left in Fig. 4 by pulling it to the housing, another block of which is shown at the point 95, which block also constitutes a bearing for the screw 82.

In Fig. 5 the optical system is shown in plan and the specifications are set forth in the following table. In this table thicknesses are measured along the optic axis which, of course, changes direction on reflection at a prism surface. The elements which are cylindrical have their curvature as seen in the plan view indicated first (at the left of the radii column) and their curvature as seen in the elevation view as shown in Fig. 5A, second (at the right of the radii column). The + and − signs indicate surfaces respectively convex and concave to the incident light beam:

| Element | $N_D$ | V | Thicknesses | Radii |
|---|---|---|---|---|
|  |  |  | Mm. | Mm. |
|  |  |  | $S_1 = 47.8$ | $R_1 = -132.5$ |
| I | 1.517 | 64.5 | $t_1 = 3.4$ | $R_2 = -52.4$ |
|  |  |  | $S_2 = 1.0$ | $R_3 = +129.2$ |
| II | 1.617 | 36.6 | $t_2 = 2.5$ | $R_4 = +30.5$ |
| III | 1.517 | 64.5 | $t_3 = 7.5$ | $R_5 = -46.7$ |
|  |  |  | $S_3 = 2.0$ | $R_6 = \infty, +471.2$ |
| IV cyl. | 1.517 | 64.5 | $t_4 = 3.0$ | $R_7 = \infty, -118.5$ |
|  |  |  | $S_4 = 121.1$ | $R_8 = +58.7, \infty$ |
| V cyl. } 56 | 1.517 | 64.5 | $t_5 = 2.7$ | $R_9 = -685.2, \infty$ |
|  |  |  | $S_5 = 0.9$ | $R_{10} = +38.2, \infty$ |
| VI cyl. | 1.517 | 64.5 | $t_6 = 3.7$ | $R_{11} = +92.3, \infty$ |
|  |  |  | $S_6 = 49.0$ | $R_{12} = \infty, +48.0$ |
| VII cyl. | 1.517 | 64.5 | $t_7 = 2.0$ | $R_{13} = \infty$ |
|  |  |  | $S_7 = 150.1$ | $R_{14} = -330.9$ |
| VIII | 1.517 | 64.5 | $t_8 = 10.0$ | $R_{15} = -148.1$ |
|  |  |  | $S_8 = 3.0$ | $R_{16} = +403.6$ |
| IX | 1.617 | 36.6 | $t_9 = 7.5$ | $R_{17} = +96.7$ |
| X | 1.517 | 64.5 | $t_{10} = 15.5$ | $R_{18} = -139.0$ |
|  |  |  | $S_9 = 19.0$ | $R_{19} = \infty, +831.2$ |
| XI cyl. | 1.517 | 64.5 | $t_{11} = 6.0$ | $R_{20} = \infty$ |
| XII prism 58 | 1.517 | 64.5 | $t_{12} = 75.0$ | $R_{21} = \infty$ |
|  |  |  | $S_{10} = 14.4$ | $R_{22} = \infty, -61.0$ |
| XIII drum 52 | 1.517 | 64.5 | $t_{13} = 7.6$ | $R_{23} = \infty, -68.6$ |
|  |  |  | $S_{11} = 1774.7$ | $R_{24} = +979.3$ |
| XIV } 64 | 1.517 | 61.5 | $t_{14} = 8.0$ | $R_{25} = -644.4$ |
| XV | 1.617 | 36.6 | $t_{15} = 6.5$ | $R_{26} = -3133.3$ |
|  |  |  | $S_{12} = 82.6$ | $R_{27} = \infty$ |
| XVI prism 70 | 1.517 | 64.5 | $t_{16} = 75.0$ | $R_{28} = \infty$ |
|  |  |  | $S_{13} = 99.0$ | $R_{29} = \infty$ |
| XVII prism 71 | 1.517 | 64.5 | $t_{17} = 159.0$ | $R_{30} = \infty$ |
|  |  |  | $S_{14} = 749.3$ | $R_{31} = +117.7$ |
| XVIII } 65 | 1.517 | 64.5 | $t_{18} = 5.0$ | $R_{32} = -76.3$ |
| XIX | 1.617 | 36.6 | $t_{19} = 3.0$ | $R_{33} = -240.6$ |
|  |  |  | $S_{15} = 69.6$ | $R_{34} = \infty$ |
| XX prism 72 | 1.517 | 64.5 | $t_{20} = 86.5$ | $R_{35} = \infty$ |
|  |  |  | $S_{16} = 48.3$ |  |

Figs. 6 and 7 relate to mounting of the moving unit to provide inherent stability. A certain point in space can be selected with respect to an optical system so that any movement of the optical system relative to that point or more exactly about an axis through that point, will not cause the image to move in the direction of the rotation. In general, there are two such points, one with respect to vertical movement of the image and a different one with respect to horizontal movement of the image. The general principles based on the fact that these points are virtual images of the nodal points of the lens are too elaborate to warrant inclusion here but the manner of applying these principles of the mounting of the scanning head will be described. The simple prism 19 of Fig. 1 which is followed by an objective 20 focuses the scanning spot on the cylinder 25. This part of the optical system is reproduced in Fig. 6. There are two points fixed relative to the optical system and remote from the image point 100 whose positions determine the position of the axial ray intercept at the point 100 with the recording surface, irrespective of small changes of orientation of the optical system. In Fig. 6 these points 101 and 102 are located as shown at a distannce f (equal to the focal length of the lens 20) from the point 100. The point 101 is within the cylinder 25 and the point 102 is on the surface of the cylinder 25. The point 101 controls the position of the image at the point 100 as far as motion parallel to the axis of the cylinder 25 is concerned, i. e. as far as motion in the plan of the drawing Fig. 6 is concerned along with the surface of the drum 25. The point 102 controls the position of the image at the point 100 vertically with respect to the horizontal view shown in Fig. 6. The point 101 thus represents the best location for the lead screw nut or other device which controls the major movement of the scanning head longitudinally. The point 102 represents the best location for whatever device will control the other component of the image position in the recording plane. Since it is not possible to place the control units in either of these points, it is necessary in Fig. 1 to make the units as rigid as possible and to merely approximate the desirable points of suspension as closely as possible.

The control points for the arrangement shown in Fig. 4 are more conveniently located, however, due primarily to the inclusion of the penta prism 72. These control points 105 and 106 are at a distance f (equal to the focal length of the lens 65) from the scanning point 51, see Fig. 7. However, the point 105 is in front of the scanning drum, and it is relatively convenient to locate the drive nut at or near this point. This principle has been incorporated into the arrangement shown in Fig. 4. Since the point 106 is on the drum 50 itself, the guides with respect to vertical movement of the image can only approximate this location. The arrangement shown in Fig. 4 has been found to be quite satisfactory in this connection.

Having thus described the preferred embodiments of my invention, I wish to point out that it is not limited to these structures but is of the scope of the appended claims.

I claim:

1. An optical scanning system comprising a rotatable cylinder, an illuminated picture area and means, including at least one objective and at least three reflecting surfaces for focusing an image of said area on the surface of the cylinder, two of the reflecting surfaces being rigidly at right angles forming a unit positioned to receive the image forming light beam parallel to the cylinder and reflect it back again parallel to the cylinder and the third reflecting surface being positioned to receive the reflected beam and in turn to reflect it radially toward the cylinder surface and means for synchronously rotating the cylinder and moving both the third reflecting surface and the reflector unit parallel to the cylinder, the unit at half the speed of the third reflecting surface whereby the length of the optical path traversed by the light beam is maintained constant.

2. A system according to claim 1 in which the reflector unit is a Porro prism and the third reflecting surface is the hypotenuse of a right angle prism.

3. A system according to claim 1 in which said at least one objective is aligned between the third reflecting surface and the cylinder surface and moves with the third reflecting surface parallel to the cylinder.

4. An optical scanning system comprising a rotatable cylinder, an illuminated picture area and means, including at least one objective and at least three reflecting surfaces for focusing an image of said area on the surface of the cylinder, at least two of the reflecting surfaces being rigidly mounted forming a unit positioned to receive the image-forming light beam parallel to the cylinder and reflect it back again parallel to the cylinder and at least one other of the reflecting surfaces forming a second unit positioned to receive the reflected beam and in turn to reflect it radially toward the cylinder surface and means for synchronously rotating the cylinder and moving both reflector units parallel to the cylinder, the first mentioned unit at half the speed of the second unit whereby the length of the optical path traversed by the light beam is maintained constant.

JOHN A. C. YULE.

No references cited.